United States Patent [19]
Moriyama et al.

[11] Patent Number: 5,575,501
[45] Date of Patent: Nov. 19, 1996

[54] SHAFT FOR COLLAPSIBLE STEERING APPARATUS

[75] Inventors: Seiichi Moriyama, Takasaki; Yasuo Matsui, Maebashi; Kiyoshi Sadakata, Gunma-ken, all of Japan

[73] Assignee: NSK Ltd., Tokyo, Japan

[21] Appl. No.: 389,807

[22] Filed: Feb. 16, 1995

[30] Foreign Application Priority Data

Sep. 9, 1994 [JP] Japan .................... 6-215495

[51] Int. Cl.$^6$ .................................................. B62D 1/19
[52] U.S. Cl. .................................... 280/777; 188/371
[58] Field of Search .................................. 280/775, 777; 74/493, 492; 188/371, 374; 180/78

[56] References Cited

U.S. PATENT DOCUMENTS

| | | | |
|---|---|---|---|
| 3,392,599 | 7/1968 | White | 280/777 |
| 3,538,783 | 11/1970 | Butts | 188/371 |
| 3,788,148 | 1/1974 | Connell et al. | 188/371 |
| 4,006,647 | 2/1977 | Oonuma et al. | 188/371 |
| 4,445,708 | 5/1984 | Oakes et al. | 280/777 |
| 5,228,720 | 7/1993 | Sato et al. | 280/777 |
| 5,342,091 | 8/1994 | Hancock | 280/777 |
| 5,464,251 | 11/1995 | Castellon | 188/371 |

FOREIGN PATENT DOCUMENTS

| | | |
|---|---|---|
| 57-41083 | 9/1982 | Japan . |
| 57-182568 | 11/1982 | Japan . |
| 57-201761 | 12/1982 | Japan . |
| 58-142178 | 9/1983 | Japan . |
| 58-51096 | 11/1983 | Japan . |
| 61-150670 | 9/1986 | Japan . |
| 63-147363 | 9/1988 | Japan . |
| 1-67178 | 4/1989 | Japan . |
| 2-286468 | 11/1990 | Japan . |
| 5-35542 | 5/1993 | Japan . |
| 1164146 | 9/1969 | United Kingdom . |
| 2269140 | 2/1994 | United Kingdom . |

*Primary Examiner*—Paul N. Dickson
*Attorney, Agent, or Firm*—Shapiro and Shapiro

[57] ABSTRACT

In a collapsible steering shaft a collapse load is decreased while assuring the heat resistance of a coupling portion between an outer shaft and an inner shaft. In addition, a time during which a great collapse load is needed is also decreased. Female serration grooves on an inner surface of the outer shaft are engaged with male serration grooves on an outer surface of the inner shaft. A recess is formed on the outer surface of the inner shaft and is aligned with a root in the male serration grooves, and a steel ball is set in the recess. A part of this steel ball intrudes into a top part of a thread in the female serration grooves. A flat portion is formed by removing a part of the male serration grooves, whereby the top part crushed by the steel ball can be prevented from frictionally engaging with the male serration grooves.

2 Claims, 5 Drawing Sheets

SHAFT FOR COLLAPSIBLE STEERING APPARATUS

BACKGROUND OF THE INVENTION

1. Field of the Invention

A shaft for collapsible steering apparatus according to the present invention is incorporated in a steering apparatus of automobile and is utilized to transmit a motion of a steering wheel to a steering gear.

2. Related Background Art

In the steering apparatus for an automobile, the mechanism as shown in FIG. 5 is used in order to transmit a motion of the steering wheel to the steering gear. A steering shaft 2 with a steering wheel 1 fixed at the rear end thereof is supported inside a steering column 3 so as to be free only in rotation. This steering column 3 is fixed to the lower surface of an instrument panel 21 through two upper and lower brackets 4, 5. An upper end of an intermediate shaft 7 is coupled through a first universal joint 6 with a portion projecting through a lower end opening of the steering column 3 at the lower end of the steering shaft 2. Further, a lower end of the intermediate shaft 7 is coupled through a second universal joint 8 with an input shaft 9 of a steering gear (not shown). As so arranged, the motion of steering wheel 1 is transmitted through the steering shaft 2 penetrating the steering column 3, the first universal joint 6, the intermediate shaft 7, and the second universal joint 8 to the input shaft 9 of the steering gear, thereby providing the wheels with a steering angle.

The steering mechanism as so arranged generally employs a collapsible arrangement, which allows the total length to decrease upon impact, for the steering column 3, steering shaft 2, and intermediate shaft 7 in order to protect a driver upon collision. Conventionally well known shafts for collapsible steering apparatus employed for that purpose are described for example in Japanese Laid-open Patent Application No. 2-286468 and Japanese Utility Model Publication No. 58-51096. Among the structures described in the publications, the structure described in Japanese Laid-open Patent Application No. 2-286468 is low in heat resistance, because coupling support between an outer shaft and an inner shaft is based only on a synthetic resin. The structure described in Japanese Utility Model Publication No. 58-51096 is arranged so that two steel balls are in contact with inner surfaces of corresponding roots in female serration grooves and that a relative displacement is permitted between the outer shaft and the inner shaft with plastic deformation at the two positions upon collision. Thus, such structure is likely to need a large force (a so-called collapse load) for decreasing the total length of the shaft for the collapsible steering apparatus. An increase in the collapse load could cause a failure to absorb a backward motion of the steering gear due to a collision that pushes the steering wheel 1 backward or changes the posture of steering shaft 2, and when the body of driver hits the steering wheel, a forward impact on the steering wheel cannot be absorbed, which exerts a strong impact on the driver's body colliding with the steering wheel and which then tends to cause serious injury to the driver. Therefore, this is not preferable.

Japanese Utility Model Application No. 4-18149 (Japanese Laid-open Utility Model Application No. 5-35542) describes the structures as shown in FIGS. 6 to 8 as arrangements for solving such a problem. FIGS. 6 and 7 show a first example of structure described in the application. This shaft 10 for collapsible steering apparatus is arranged so that the total length is decreased with application of an impact force in the axial direction because the outer shaft 11 with the inner shaft 12 are arranged so as to be capable of being displaced relative to each other in the axial direction. The outer shaft 11 is a circular cylinder throughout its length, where female serration grooves 13 are formed on an inner surface at one end of the shaft 11. The inner shaft 12 is a circular rod throughout its length, where male serration grooves 14 to be engaged with the above female serration grooves 13 are formed on an outer surface at one end of the shaft 12.

A recess 16 is formed at a portion corresponding to a root 15 in the male serration grooves 14 on the outer surface at one end of the inner shaft 12, and a steel ball 17, which is a hard member, is set in the recess 16. Then the female serration grooves 13 are engaged with the male serration grooves 14 so as to couple the outer shaft 11 with the inner shaft 12 and to cause a part of the steel ball 17 to intrude into a top part 18 of a thread in the female serration grooves 13. Namely, in the case of the shaft 10 shown in FIGS. 6 and 7, the outer shaft 11 and inner shaft 12 are coupled with each other by intruding a part of the steel ball 17 set in the recess 16 formed on the outer surface at the one end of inner shaft 12 into the top part 18 of the thread in the female serration grooves 13 formed on the inner surface of outer shaft 11. As described, because the coupling between the outer shaft 11 and the inner shaft 12 is based on the steel ball 17, the heat resistance of the coupling portion is sufficiently high as compared with the aforementioned structure with the coupling support only of the synthetic resin, thereby avoiding an event that the supporting force of the coupling portion becomes insufficient depending upon operation conditions.

In the case where, during primary collision of a car with another car or other object, the steering gear is pushed backward (in the case of use as the intermediate sheet 7) or in the case where, during secondary collision of the driver's body with the steering wheel (in the case of use as the steering shaft 2), a strong force is exerted on the shaft 10 in the axial direction, the steel ball 17 plastically deforms the top part 18 of the thread in the female serration grooves 13 to permit a relative displacement between the outer shaft 11 and the inner shaft 12, thereby decreasing the total length of the shaft 10. In the case of this shaft 10, because the steel ball 17 is in contact with the female serration grooves 13 at the top part 18 of the thread in the female serration grooves 13, a relatively small force is enough to cause the plastic deformation. Therefore, when this shaft 10 is used as the steering shaft 2 or as the intermediate shaft 7 (FIG. 5), the arrangement can prevent the collapse load necessary for decreasing the total length of the shafts 2, 7 from becoming large or can enhance the effect of preventing a great impact force from being exerted on the driver's body when colliding with the steering wheel upon a colliding accident.

In the structural example shown in FIGS. 6 and 7, a combination of the recess 16 and steel ball 17 are provided at only one point in the axial direction, but plural combinations of those may be provided at a plurality of portions for arrangements with a long serration engagement portion. The application also describes a second example shown in FIG. 8 wherein a plurality of recesses 16, 16 and steel balls 17, 17 are provided at plural portions in the circumferential direction. By such an arrangement wherein the recesses 16, 16 and steel balls 17, 17 are provided at the plural portions in the circumferential direction, a support force acting between the inner surface of outer shaft 11 and the outer surface of inner shaft 12 becomes substantially uniform throughout the circumferential direction, so that displacement of the shafts 11, 12 relative to each other may be effected more smoothly upon collision.

The prior art structures as shown in FIGS. 6 to 8, however, still have a point to be improved as described below. In the shafts 10 shown in FIGS. 6 to 8, rattle is stopped between the outer shaft 11 and the inner shaft 12 by intruding the steel ball(s) 17 held in the recess(es) 16 on the outer surface of inner shaft 11 into the top part(s) 18 of the thread(s) in the female spline grooves 13 formed on the inner surface of outer shaft 11. Thus, a portion of the top part 18, which is a portion strongly pressed by the steel ball 17 on the inner surface, is plastically deformed to have an increased width at the top part. Then a great frictional force acts on the engaging portion when the thus plastically deformed portion is engaged with the root 15 in the male serration grooves 14 formed on the outer surface of the inner shaft 12. This increases the stroke over which a large load is necessary for decreasing the total length of the shaft 10, which increases the possibility that a great impact is applied to the driver's body when colliding with the steering wheel upon collision.

In the original design of the shaft 10, when the total length of the shaft 10 is decreased by a length $L_1$ shown in FIG. 6, which is a distance between the setting portion of the steel ball 17 and one end of the female serration grooves 13, and when the steel ball 17 has left the female serration grooves 13, a load necessary for further decreasing the total length of shaft 10 becomes extremely small. In other words, the original design is such that some load is necessary for the first stroke $L_1$ to decrease the total length of shaft 10 upon a secondary collision, but a further decrease can be effected with a very small load over the stroke $L_2$.

In contrast, in the case of actual shaft 10, the load necessary for decreasing the total length of the shaft 10 is great before the portion of the outer shaft 11 plastically deformed by the steel ball 17 leaves the male spline grooves 14 on the outer surface of inner shaft 12. Although the plastically deformed portion is normally a portion abutting the steel ball 17, the area of the plastically deformed portion increases along the stroke $L_1$ as the total length of shaft 10 is decreased upon collision. Then, the load necessary for until the total length of the shaft 10 stays large until the entire plastically deformed portion in the range of $L_1$ leaves the female spline grooves 13.

Accordingly, the length $L_2$ in FIG. 6, which is a distance between the setting portion of steel ball 17 and the other end of female serrations 13, is added to the stroke $L_1$ to define the range necessitating the great load for decreasing the total length of shaft 10. For example, according to measurements by the inventors, the axial load changed as shown in FIG. 9 when a strong force was applied in the axial direction of shaft 10 in order to decrease the total length of shaft 10. In FIG. 9, the vertical axis represents the amplitude of load and the horizontal axis represents an amount of decrease of shaft 10. The length $L_3$ necessitating the great load for decreasing the total length of shaft 10 became approximately equal to $L_1+L_2$ ($L_3 \approx L_1+L_2$).

If the load necessary for decreasing the total length of shaft 10 is kept large over the long stroke range ($L_3$) or during a long time period as described above, a great impact is applied on the driver's body when colliding with the steering wheel upon collision, which is not preferable with regard to protecting the driver. The aforementioned application describes a technique of once extending and contracting the shaft 10 before the shaft 10 is incorporated inside the steering column 3 in order to stabilize the load necessary for decreasing the total length of shaft 10 upon collision. This technique can expect some improvement, but it cannot be said as a sure solution, because the loads exerted in production are often different in direction or magnitude from those exerted upon collision and therefore the plastic deformation by the steel ball 17 sometimes differs between them.

SUMMARY OF THE INVENTION

Under the above circumstances, an object of the present invention is to provide a shaft for collapsible steering apparatus, which needs only a low and stable load to decrease the total length of the shaft.

In the present invention a shaft for a collapsible steering apparatus can be constructed, similar to the prior art shafts for collapsible steering apparatus as described in the aforementioned application, to comprise an outer shaft with female serration grooves formed on an inner surface thereof, an inner shaft with male serration grooves formed on an outer surface thereof and capable of being engaged with the female serration grooves, a recess formed on the outer surface of the inner shaft and at a portion corresponding to a root in the male serration grooves, and a hard member set in the recess, wherein the female serration grooves are engaged with the male serration grooves and wherein a part of the hard member intrudes into a top part of a thread in the female serration grooves.

Additionally, in accordance with a first aspect of the invention, the shaft for collapsible steering apparatus is arranged so that a relief for avoiding friction between the top part of the thread into which the hard member intrudes, and the outer surface of the inner shaft is provided on a part of the outer surface of the inner shaft and at a portion closer to the center in the axial direction of the inner shaft than the recess.

In accordance with a second aspect of the invention, the shaft for collapsible steering apparatus can be constructed to comprise an outer shaft with female serration grooves formed on an inner surface thereof, an inner shaft with male serration grooves formed on an outer surface thereof and engaged with the female serration grooves, a recess formed on the outer surface of the inner shaft and at a portion corresponding to a root in the male serration grooves, and a hard member set in the recess, wherein the female serration grooves are engaged with the male serration grooves and wherein a part of the hard member intrudes into the inner surface of the outer shaft.

Additionally, the shaft for collapsible steering apparatus is arranged so that, by omitting threads at part of the female serration grooves at a same phase position in the circumferential direction as the recess, a relief for avoiding friction between the male serration grooves and the female serration grooves is provided throughout the total length of the female serration grooves.

In the present invention as so arranged, the shaft for collapsible steering apparatus can prevent the portion where the relief is provided on the outer surface of the inner shaft from frictionally engaging with a portion plastically deformed due to pressure of the hard member at the top part of the thread in the female serration grooves. Thus, after the hard member has left the female serration grooves, the load necessary for decreasing the total length of shaft becomes smaller.

Further, because the shaft for collapsible steering apparatus has the relief formed by removing the threads which are a part of the female spline grooves and a part pressed by the hard member, the inner surface will not have any plastically deformed portion which can engage under strong friction with the male spline grooves even after the hard member has moved in the axial direction on the inner surface of the outer shaft with contraction of the shaft. Therefore, after the hard member has left the female serration grooves, the load necessary for decreasing the total length of shaft becomes smaller.

DESCRIPTION OF THE PREFERRED EMBODIMENTS

Figure 1:
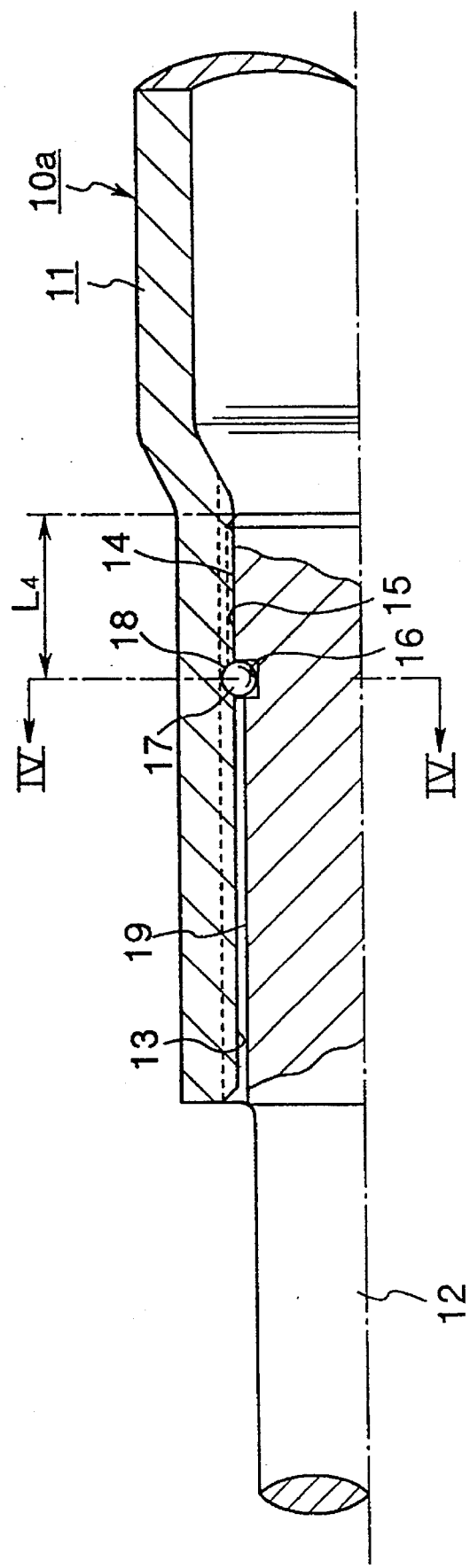
FIG. 1 is a partial cross section showing a first embodiment of the present invention.
Figure 2:
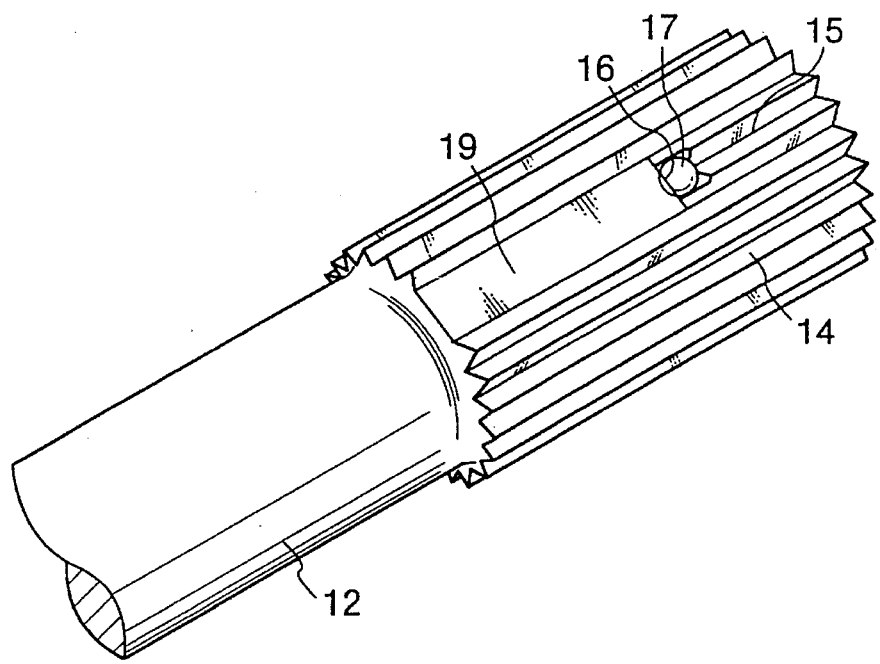
FIG. 2 is a perspective view showing an end part of an inner shaft as a constituent of the first embodiment.

FIGS. 1 and 2 show the first embodiment of the present invention. A specific feature of the shaft for collapsible steering apparatus according to the present invention is that the load necessary to decrease the total length upon collision is made smaller after a lapse of a short time period. Since the constitution and effects of the other parts are the same as those in the conventional structure as described in the aforementioned application, same or equivalent parts will be denoted by the same reference numerals and redundant description will be omitted or briefly described. Thus, mainly the characteristic part of the present invention will be explained.

A flat portion 19 is formed at an end portion of inner shaft 12 by cutting a part of male serration grooves 14 formed at the end portion, thereby serving as a relief for avoiding friction between the top part 18 of the thread into which the steel ball 17 intrudes, and the outer surface of inner shaft 12. Thus, the flat portion 19 is formed in the same phase in the circumferential direction as the recess 16 in which the steel ball 17, which is a hard member, is set, and is located in a portion closer to the center, in the axial direction, of the inner shaft 12 (on the left side in FIGS. 1 and 2) than the recess 16. While the female serration grooves 13 formed on the inner surface at the end portion of outer shaft 11 are engaged with the male serration grooves 14 formed on the outer surface at the end portion of inner shaft 12, a portion of the female serration grooves 13 opposed to the flat portion 19 is separate from the male serration grooves 14.

With the shaft for collapsible steering apparatus of the present invention as so arranged, the portion where the flat portion 19 is formed as a relief on the outer surface of inner shaft 12 is free of frictional engagement with the portion plastically deformed due to the press of the steel ball 17 at the top part 18 of the thread in the female serration grooves 13. When the total length of shaft 10a is decreased upon collision, the steel ball 17 first crushes the top part 18 throughout the range $L_4$ in FIG. 1, so that this top part 18 is plastically deformed by spreading the width. When the decrease of the total length of shaft 10a exceeds $L_4$, the steel ball 17 comes away from the female serration grooves 13 and the plastically deformed portion comes to he opposed to the flat portion 19.

As apparent from FIGS. 1 and 2, the central area of the flat portion 19 located at the same phase position in the circumferential direction as the recess 16 is located more inward, in the direction of the diameter of the cross section of inner shaft 12, than the bottom of the male serration grooves 14. Therefore, after the total length of shaft 10a is decreased over $L_4$ and after the steel ball 17 has left the female serration grooves 13, the load necessary for decreasing the total length of shaft 10a becomes smaller. Namely, the steel ball 17 and plastically deformed portion are free of frictional engagement with each other in this state, so that the shaft 10a can be collapsed with a small force.

Figure 3:
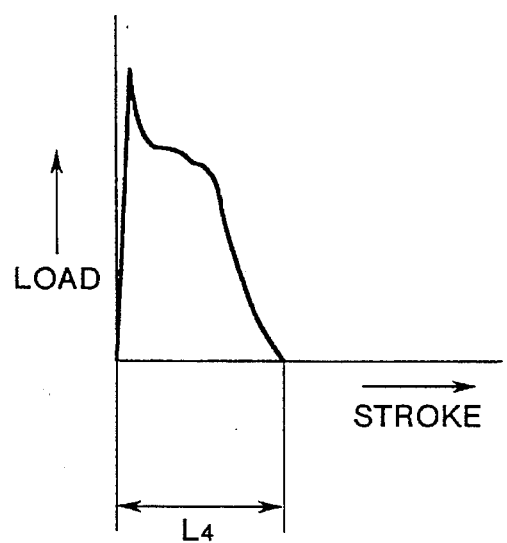
FIG. 3 is a graph showing a change of impact load when collapsing the shaft of the first embodiment.
Figure 6:
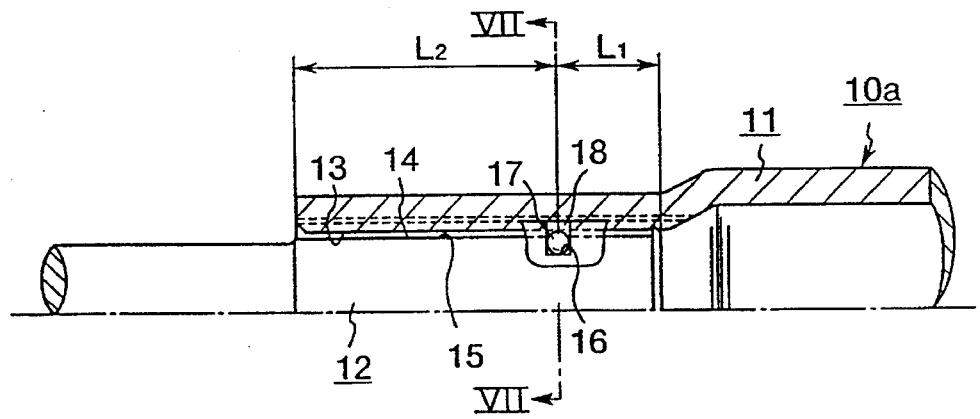
FIG. 6 is a side view, partly in cross section, showing a first example of prior art structure.
Figure 7:
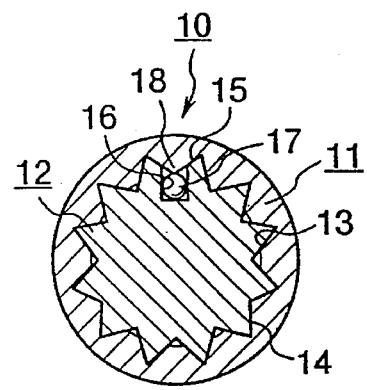
FIG. 7 is a drawing showing a section VII—VII of FIG. 6.
Figure 8:
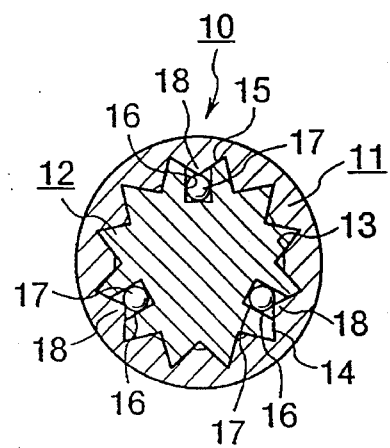
FIG. 8 is a drawing showing a second example of prior art structure and a cross section similar to FIG. 7.
Figure 9:
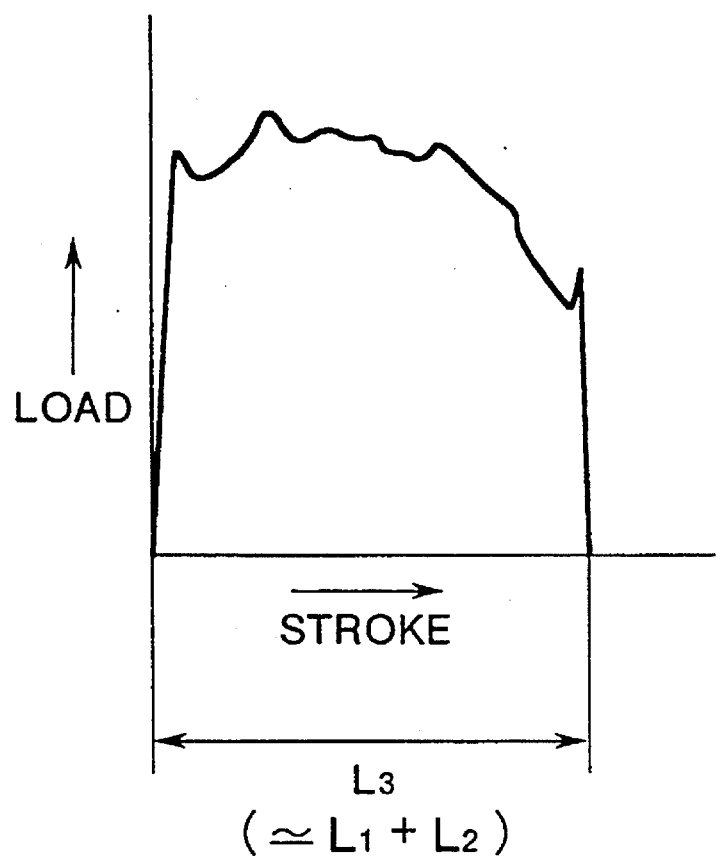
FIG. 9 is a graph showing a change of impact load in collapsing the prior art shaft.

For example, according to the measurements by the inventors, when a strong force was applied to the shaft 10a in the axial direction thereof to decrease the total length of the shaft 10a, the axial load changed as shown in FIG. 3. Similar to FIG. 9, FIG. 3 shows the magnitude of load on the vertical axis and the degree of contraction of shaft 10a on the horizontal axis. The length $L_4$ in which a great load is necessary for decreasing the total length of the shaft 10a is coincident with the length $L_4$ of the portion where the flat portion 19 is not formed in the end portion of the male serration grooves 14. As is apparent from FIG. 3, the shaft 10a of the present invention has a shorter stroke, or, in other words, a shorter time, in which a great load is necessary for decreasing the total length, than the prior art structure described previously. Thus, when controlling a change of posture of the steering shaft 2, no great impact will be applied to the driver's body when colliding with the steering wheel upon collision, thereby protecting the driver. It should be noted that the recess 16, steel ball 17, and flat portion 19 may be provided at a plurality of locations in the circumferential direction, similar to the prior art structures shown in FIGS. 6 to 8.

Figure 4:
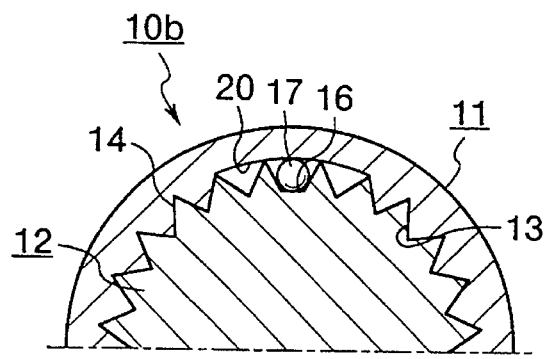
FIG. 4 is a drawing showing a second embodiment of the present invention and a cross section corresponding to section IV—IV of FIG. 1.
Figure 5:
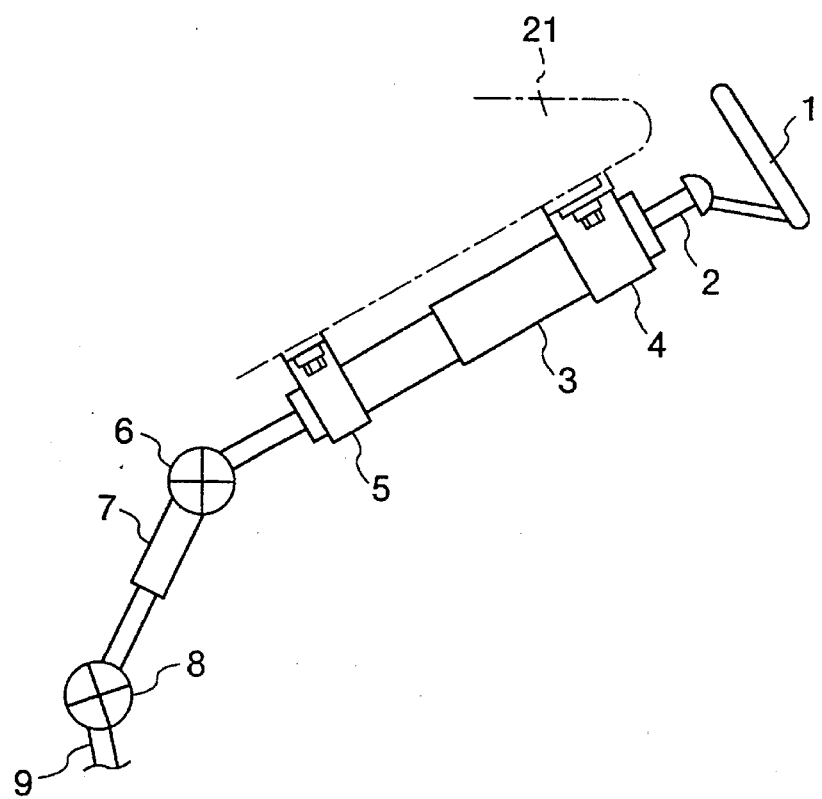
FIG. 5 is a side view showing an example of steering apparatus in which a shaft for collapsible steering apparatus according to the present invention is incorporated.

Next, FIG. 4 shows the second embodiment of the present invention. In the present embodiment, a cylindrical surface portion 20 is formed throughout the entire length of the female serration grooves 13 by removing a thread portion present at the same phase position in the circumferential direction as the recess 16 receiving the steel ball 17 at a part of the female serration grooves 13 formed on the inner surface at the end portion of outer shaft 11. The steel ball 17 is urged against the cylindrical surface portion 17. This cylindrical surface portion 20 becomes a relief for avoiding friction between the male spline grooves 14 formed on the outer surface at the end portion of inner shaft 12 and the female spline grooves 13.

When the decrease of shaft 10b as so arranged moves the steel ball 17 in the axial direction (into the plane of FIG. 4) on the inner surface of outer shaft 11, the inner surface will not have any plastically deformed portion which could have great friction with the male spline grooves 14. Namely, during collapse of the shaft 10b, only a depressed groove with arcuate cross section is formed throughout the axial direction on the cylindrical surface portion 20 pressed hard by the steel ball 17, and after the steel ball 17 has left the female serration grooves 13, the load necessary for decreasing the total length of shaft 10b becomes smaller. It should also be noted that the recess 16, steel ball 17, and the cylindrical surface portion 20 may be provided at a plurality of locations in the circumferential direction in the present embodiment.

The shafts for collapsible steering apparatus according to the present invention are constructed and operated as described above and therefore, the collapse load is lowered while maintaining sufficient heat resistance as in the prior art structures described in the aforementioned applications, thus effectively securing the safety of driver in a colliding accident. Particularly, the shafts for collapsible steering apparatus according to the present invention can decrease the time period in which the collapse load is high, thereby further improving the performance in securing the safety of driver.

What is claimed is:

1. A shaft for collapsible steering apparatus, comprising:

an outer shaft having female serration grooves on an inner surface thereof;

an inner shaft having male serration grooves on an outer surface thereof that engage said female serration grooves, said inner shaft having a recess on said outer surface at a portion corresponding to a root in the male serration grooves; and a hard member disposed in said recess and having a part that intrudes into part of a serration among said female serration grooves, wherein a relief, for avoiding friction between said part of said serration into which the hard member intrudes and said outer surface of the inner shaft, is provided on said outer surface at a portion among said male serration grooves and closer than said recess to a center of said inner shaft in an axial direction of said inner shaft.

2. A shaft for collapsible steering apparatus, comprising:

an outer shaft having female serration grooves on an inner surface thereof;

an inner shaft having male serration grooves on an outer surface thereof that engage said female serration grooves, said inner shaft having a recess on said outer surface at a portion corresponding to a root in the male serration grooves; and a hard member disposed in said recess and having a part that intrudes into said inner surface of the outer shaft, wherein a relief, for avoiding friction between said male serration grooves and said female serration grooves, is provided by omitting serrations of said female serration grooves on said inner surface at a portion that extends throughout an entire length of said female serration grooves and that is aligned with said recess.

* * * * *